United States Patent [19]
Lu

[11] Patent Number: 5,271,635
[45] Date of Patent: Dec. 21, 1993

[54] CHAINLESS BICYCLE HAVING A FRONT WHEEL RESILIENT SUSPENSION

[76] Inventor: Teng-Hui Lu, 29 Nei Keng Village, Ta Liao Hsiang, Kaohsiung, Taiwan

[21] Appl. No.: 944,114

[22] Filed: Sep. 11, 1992

[51] Int. Cl.⁵ ............................................. B62K 19/02
[52] U.S. Cl. .................................. 280/275; 280/259; 280/283
[58] Field of Search ............... 280/275, 276, 277, 259, 280/262, 278, 283, 286, 716

[56] References Cited

U.S. PATENT DOCUMENTS
5,069,468  12/1991  Tsai et al. ..................... 280/278

FOREIGN PATENT DOCUMENTS
0553962  6/1923  France ........................... 280/275
0811781  4/1937  France ........................... 280/283
0000684  4/1980  World Int. Prop. O. ........ 280/259

Primary Examiner—Margaret A. Focarino
Assistant Examiner—Anne Marie Boehler
Attorney, Agent, or Firm—Morton J. Rosenberg; David I. Klein

[57] ABSTRACT

This invention relates to a front wheel resilient suspension system for a chainless bicycle where a horizontal bar member extends between a main bar member located under the bicycle seat to a horizontal bar connector mechanism which is resiliently mounted to both the horizontal bar member and the handlebar of the chainless bicycle. A buckle mechanism located on the horizontal bar member allows for pivotal displacement of the handlebar with respect to the bicycle seat and provides for a responsive displacement of the center of gravity of a bicycle rider on rough terrain which adds to the cushioning effect and the comfort of the bicycle rider.

1 Claim, 4 Drawing Sheets

CHAINLESS BICYCLE HAVING A FRONT WHEEL RESILIENT SUSPENSION

BACKGROUND OF THE INVENTION

1. FIELD OF THE INVENTION

This invention directs itself to a chainless bicycle which includes a front wheel resilient suspension for adjusting the center of gravity of a rider responsive to displacement of the bicycle wheels. In particular, this invention relates to a front wheel suspension where the handlebars are resiliently and displaceably coupled to a main bar member coupled to a bicycle seat mounting.

2. PRIOR ART

The bicycle seats of most chainless bicycles are designed to be located between the front and rear wheels. The bicyclist riding such a bicycle lacks comfort due to the rear location of his or her center of gravity when bicycling in rough terrain. The subject front wheel resilient suspension system for a chainless bicycle solves the problem of prior art chainless bicycles as shown in FIG. 1. The prior art chainless bicycles dictate that the bicycle seat move backward from the center of the rear wheel which causes the bicycle to be raised due to the weight applied to the bicycle. This is a drawback of prior art chainless bicycles and this disadvantage cannot be obviated without solving the problem of the location of the user's center of gravity.

SUMMARY OF THE INVENTION

This invention provides a chainless bicycle having a front wheel resilient suspension. The main purpose of the subject invention is to solve the problem of unstable center of gravity caused by the rearward movement of the user's center of gravity found in prior art chainless bicycles. The bicycle feels more stable with use of the front wheel suspension due to the fact that the center of gravity of the bicyclist adjusts with variable displacements.

Additionally, the subject system increases the cushioning effect and increases the comfort of the bicyclist in riding on rough terrain.

DESCRIPTION OF THE PREFERRED EMBODIMENTS

Figure 1:
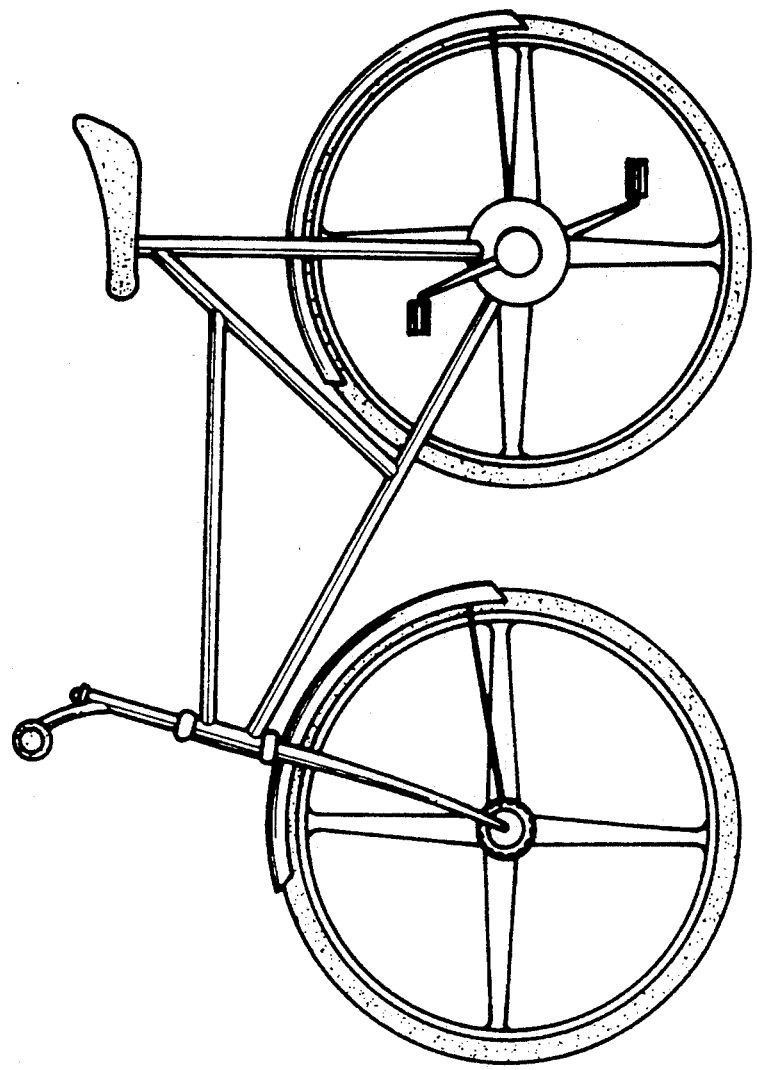
FIG. 1 is an elevational view of a prior art chainless bicycle.
Figure 2:
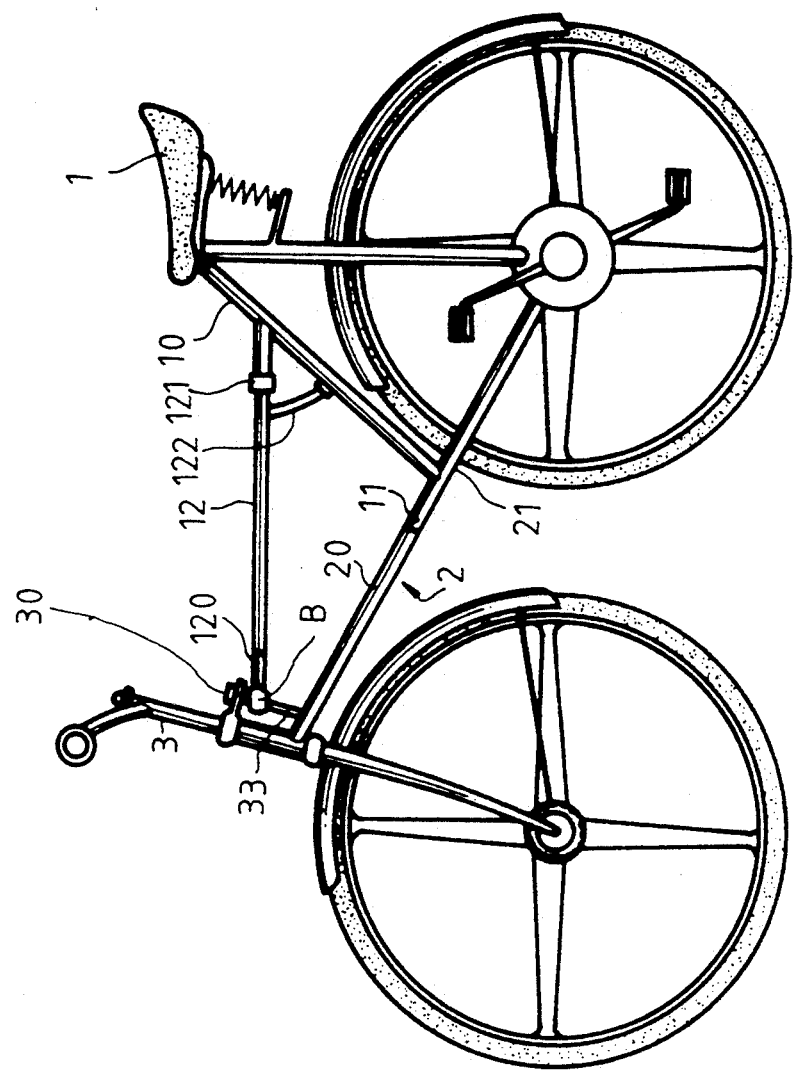
FIG. 2 is an elevational view of the subject chainless bicycle showing the inventive concept.
Figure 5:
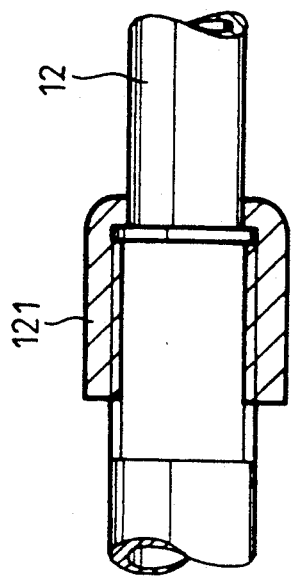
FIG. 5 is an elevational partially cut-away view of the rear end of the horizontal bar member with a threaded coupling member.
Figure 6:
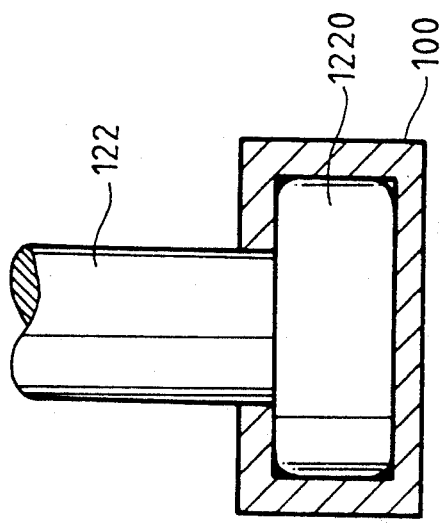
FIG. 6 is an elevational view partially cut-away of a brace member.
Figure 3:
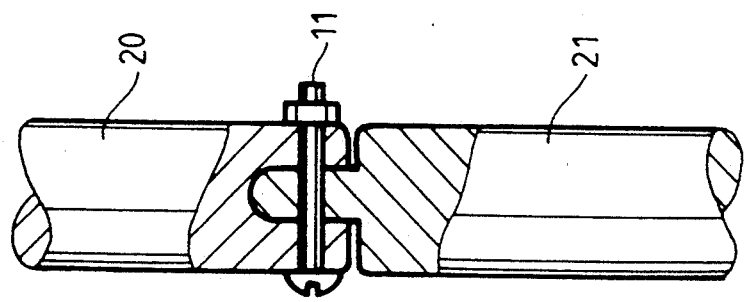
FIG. 3 is an elevational partially cut-away view showing a connecting buckle.

Referring now to FIG. 2, there is shown bicycle inclined main bar member 10 secured to and located under seat 1. A center bar member 2 includes front bar member 20 and rear bar member 21 with main bar 10 fixedly connected to rear bar 21. Front bar 20 and rear bar 21 are coupled each to the other by connecting buckle 11 as shown in FIG. 3. The main bar 10 is secured to horizontal bar 12 by thread member 121. Horizontal bar member 12 extends frontally as shown and is coupled to horizontal bar buckle connector 30 on handlebar 3 through connecting buckle 120. Arcuate bar or brace 122 positioned on a rear portion of horizontal bar 12 is mounted within insert slot 100 of insert member 1220 on main bar member 10 as shown in FIGS. 5 and 6.

Figure 4:
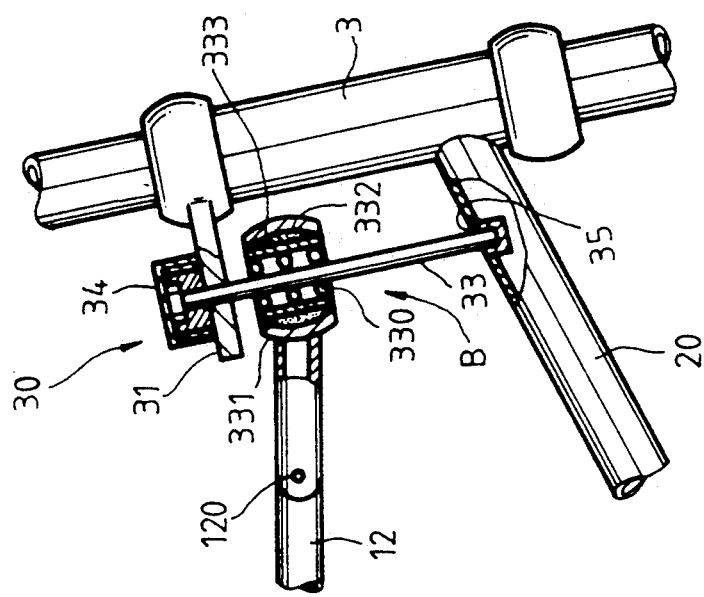
FIG. 4 is an elevational partially cut-away view showing a horizontal bar buckle connector mechanism.

Referring to FIG. 2 and FIG. 4, the horizontal bar buckle connector 30 is fixedly welded to an inner portion of handlebar 3 by fixing plate member 31. Buffer bar 33 extends through the fixing plate member 31 and is secured by nut 34 on a top end thereof as shown. The lower portion of the horizontal bar buckle connector 30 is insertable within front bar 20 of center bar member 2. Slot 35 formed in the front bar 20 provides an insert for buffer bar 33 in order to position the buffer bar 33 substantially parallel to handlebar 3.

Connecting horizontal bar 12 is coupled to the center of buffer bar 33 by buckle connector B which includes outer frame 333. Buckle connector B is provided with brass beads 330 surrounded by resilient cushion 332 interfacing with buffer bar 33 extending therethrough as shown. The buffer bar 33 passes through and is surrounded by outer frame 33 as shown in FIG. 4 to form a highly sensitive displacement of horizontal bar member 12 with respect to a movement of buffer bar member 33. At the same time, the apparatus cooperates with front connecting buckle 120 of horizontal bar member 12 and connecting buckle 11 of the center bar 2. Thus, the horizontal bar 12 moves up/down on buffer bar 33 and connecting buckle 120 varies its angle to reduce vibrational forces. This movement provides a buffer effect as shown in FIG. 7 and maintains the bicyclist's center of gravity frontally while riding on a rough surface.

Figure 7:
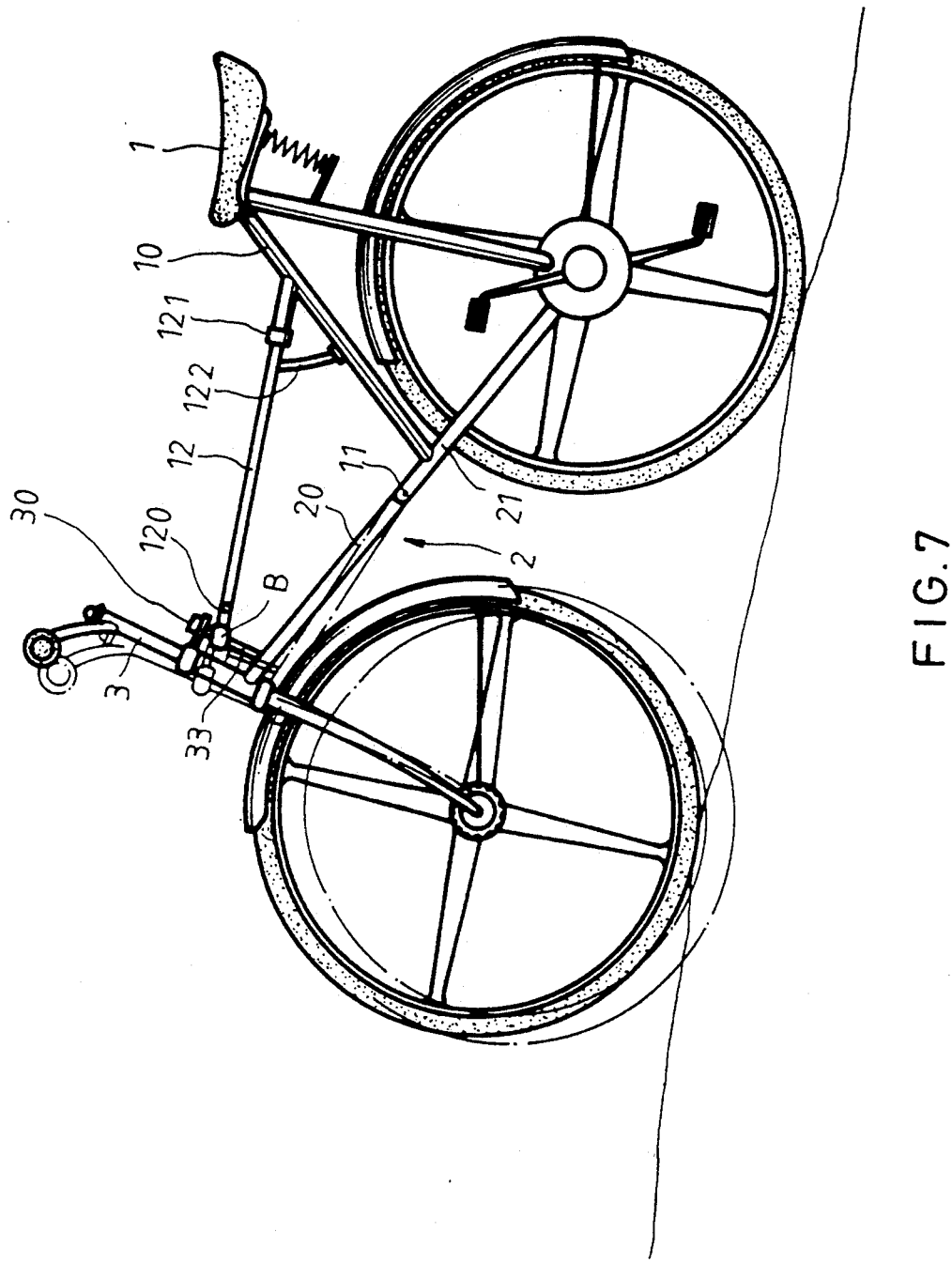
FIG. 7 is an elevational view of the subject bicycle being driven on rough terrain.

Referring to FIG. 7, the front wheel raises higher than the rear wheel compared to a horizontal plane when the chainless bicycle climbs a slope. In this mode of operation, the front wheel is higher than the rear wheel. At the same time, the handlebar 3 moves upwardly to pivot buckle 11 and connector B and allows the seat 1 to move forward in an arcuate contour to solve the problem of the location of the center of gravity and move the center of gravity forwardly.

I claim:

1. A front wheel resilient suspension for a chainless bicycle having a bicycle seat, a front wheel and a rear wheel comprising:
   (a) a center bar member extending in an inclined direction between said rear wheel and a handlebar of said bicycle, said center bar member having a rear bar member and a front bar member coupled each to the other by a center bar buckle member;
   (b) a main bar member connected on opposing ends to said bicycle seat and said rear bar member;
   (c) a horizontal bar member secured on a first end to said main bar member and having a frontal connecting buckle for pivotal displacement of one portion of said horizontal bar member with respect to a remaining portion thereof, said horizontal bar member being coupled to said main bar member by a threaded securement member;
   (d) an arcuately directed brace member extending between said horizontal bar member and said main bar member having a flanged end for insert into an inlay member located on said main bar member; (e) handlebar connector means for coupling said handlebar to said horizontal bar member, said handlebar connector means being coupled to said handlebar by a fixing plate member, said handlebar connector means including an extended buffer bar member extending through said fixing plate member and positionally located in a substantially parallel direction to an extension direction of said handlebar, said buffer bar member having opposing first and second ends, said first end of said buffer bar member having a buffer bar nut member secured thereto, said second end of said buffer bar member being inserted into a slot formed within said front bar member; and, (f) a horizontal bar buckle connector secured to said horizontal bar member on a second end thereof, said horizontal bar buckle connector defining a resilient material member sandwiched between an outer frame and an inner frame, said buffer bar member extending through said inner frame member interfacing with a plurality of spherically contoured members located between said buffer bar member and said inner frame for providing a resilient suspension for said front wheel.

* * * * *